United States Patent
Majd et al.

(10) Patent No.: US 12,341,369 B2
(45) Date of Patent: Jun. 24, 2025

(54) INVERTER-BASED MICROGRID INCLUDING KINETIC STORAGE DEVICE AND METHOD OF OPERATING THE SAME

(71) Applicant: BLOOM ENERGY CORPORATION, San Jose, CA (US)

(72) Inventors: Afshin Majd, San Jose, CA (US); Prasad Pmsvvsv, Sunnyvale, CA (US); Carlton Cottuli, Franklin, MA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 0 days.

(21) Appl. No.: 18/484,774

(22) Filed: Oct. 11, 2023

(65) Prior Publication Data

US 2024/0128776 A1 Apr. 18, 2024

Related U.S. Application Data

(60) Provisional application No. 63/379,187, filed on Oct. 12, 2022.

(51) Int. Cl.
*H02J 7/00* (2006.01)
*H02J 7/34* (2006.01)
*H02J 15/00* (2006.01)

(52) U.S. Cl.
CPC .......... *H02J 7/0068* (2013.01); *H02J 15/007* (2020.01); *H02J 7/345* (2013.01); *H02J 2207/20* (2020.01)

(58) Field of Classification Search
CPC .... H02J 7/0068; H02J 15/007; H02J 2207/20; H02J 7/345
See application file for complete search history.

(56) References Cited

U.S. PATENT DOCUMENTS

| | | |
|---|---|---|
| 8,970,176 B2 | 3/2015 | Ballantine et al. |
| 9,019,700 B2 | 4/2015 | Ballantine et al. |
| 9,059,600 B2 | 6/2015 | Godrich et al. |
| 9,089,077 B2 | 7/2015 | Ballantine et al. |
| 9,106,098 B2 | 8/2015 | Srinivasan et al. |
| 9,214,812 B2 | 12/2015 | Ballantine et al. |
| 9,461,319 B2 | 10/2016 | Sudhan et al. |
| 9,461,320 B2 | 10/2016 | Ballantine et al. |
| 9,698,598 B2 | 7/2017 | Ballantine et al. |
| 9,972,852 B2 | 5/2018 | Ballantine et al. |
| 10,322,637 B2 | 6/2019 | Srinivasan et al. |

(Continued)

OTHER PUBLICATIONS https://www.activepower.com/en-GB/2813/flywheel-technology#:~:text=Active%20Power's%20CleanSource%20flywheel%20technology.an%20elegant%20and%20economical%20solution.&text=For%2099%25%20of%20its%20operating.rotor%20spinning%20at%207%20700%20RPM (Viewed on Oct. 11, 2023).

*Primary Examiner* — Carlos Amaya
(74) *Attorney, Agent, or Firm* — THE MARBURY LAW GROUP PLLC (57) ABSTRACT

A microgrid power system includes a power module configured to generate direct current (DC) power, an inverter module having a DC side and an AC side, and configured to invert DC power received from the power module on the DC side and output alternating current (AC) power on the AC side, a DC bus electrically connecting an output of the power module to an input on the DC side of the inverter module, an AC load bus configured to electrically connect an output on the AC of the inverter module to an AC load, an energy storage device electrically connected to the DC bus, and a kinetic storage device (KSD) device electrically connected to the AC load bus on the AC side of the inverter module.

20 Claims, 4 Drawing Sheets

(56) References Cited

U.S. PATENT DOCUMENTS

| | | |
|---|---|---|
| 10,573,910 B2 | 2/2020 | Sudhan et al. |
| 10,596,919 B2 | 3/2020 | Srinivasan et al. |
| 10,756,546 B2 | 8/2020 | Pmsvvsv et al. |
| 10,797,514 B2 | 10/2020 | Gross et al. |
| 10,809,308 B2 | 10/2020 | Ballantine et al. |
| 10,873,099 B1 | 12/2020 | Gurunathan et al. |
| 10,989,760 B2 | 4/2021 | Ballantine et al. |
| 11,092,652 B2 | 8/2021 | Cottuli |
| 11,128,147 B2 | 9/2021 | Ballantine et al. |
| 11,335,928 B2 | 5/2022 | Sudhan S et al. |
| 11,355,955 B2 | 6/2022 | Cottuli et al. |
| 2005/0200133 A1* | 9/2005 | Wobben .................. H02J 3/40 290/55 |
| 2020/0076200 A1* | 3/2020 | Ballantine ............... H01M 8/10 |
| 2021/0218249 A1* | 7/2021 | Dong ..................... B60L 53/52 |
| 2021/0359623 A1 | 11/2021 | Pmsvvsv et al. |

* cited by examiner

INVERTER-BASED MICROGRID INCLUDING KINETIC STORAGE DEVICE AND METHOD OF OPERATING THE SAME

FIELD

The present disclosure is directed a microgrids in general, and in particular to inverter-based microgrids including kinetic storage devices and methods of operating the same.

BACKGROUND

A microgrid is a group of interconnected loads and distributed energy resources within electrical boundaries that acts as a single controllable entity with respect to the main power grid. For example, a microgrid may include a local power generator, a load, a load management controller, a grid isolation switch, and a switch controller.

A microgrid can operate in a grid mode where the microgrid is electrically connected to the main power grid, and can operate in an island mode where the microgrid is disconnected from the main power grid and the microgrid is powered by the local power generator only.

SUMMARY

According to various embodiments, a microgrid power system includes a power module configured to generate direct current (DC) power, an inverter module having a DC side and an AC side, and configured to invert DC power received from the power module on the DC side and output alternating current (AC) power on the AC side, a DC bus electrically connecting an output of the power module to an input on the DC side of the inverter module, an AC load bus configured to electrically connect an output on the AC of the inverter module to an AC load, an energy storage device electrically connected to the DC bus, and a kinetic storage device (KSD) device electrically connected to the AC load bus on the AC side of the inverter module.

According to various embodiments, a method of operating a microgrid power system comprises providing direct current (DC) power from a power module to an energy storage device and to a DC side of an inverter module, and providing alternating current (AC) power from an AC side of the inverter module to an AC load and to a kinetic storage device (KSD).

BRIEF DESCRIPTION OF THE DRAWINGS

The accompanying drawings, which are incorporated herein and constitute part of this specification, illustrate examples of the disclosed devices and methods, and together with the general description given above and the detailed description given below, serve to explain the features of the invention.

DETAILED DESCRIPTION

As set forth herein, various aspects of the disclosure are described with reference to the exemplary embodiments and/or the accompanying drawings in which exemplary embodiments of the invention are illustrated. This invention may, however, be embodied in many different forms and should not be construed as limited to the exemplary embodiments shown in the drawings or described herein. It will be appreciated that the various disclosed embodiments may involve particular features, elements or steps that are described in connection with that particular embodiment. It will also be appreciated that a particular feature, element or step, although described in relation to one particular embodiment, may be interchanged or combined with alternate embodiments in various non-illustrated combinations or permutations.

It will also be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Ranges can be expressed herein as from "about" one particular value, and/or to "about" another particular value. When such a range is expressed, examples include from the one particular value and/or to the other particular value. Similarly, when values are expressed as approximations, by use of the antecedent "about" or "substantially" it will be understood that the particular value forms another aspect. In some embodiments, a value of "about X" may include values of +/−1% X. It will be further understood that the endpoints of each of the ranges are significant both in relation to the other endpoint, and independently of the other endpoint.

Herein, a "current cycle" may refer to an alternating current (AC) current cycle, such as a 60 Hertz AC current cycle. As would be apparent to one of ordinary skill in the art, the component "connections" described below are intended to refer to "electrical connections" unless otherwise specified.

Unless otherwise expressly stated, it is in no way intended that any method set forth herein be construed as requiring that its steps be performed in a specific order. Accordingly, where a method claim does not expressly recite an order to be followed by its steps or it is not otherwise specifically stated in the claims or descriptions that the steps are to be limited to a specific order, it is no way intended that any particular order be inferred.

Distributed energy resources (DER), such as fuel cells, wind turbines, solar photovoltaics (PV), microturbines, or combinations thereof may provide an alternative to the utility grid for powering local electrical distribution networks, such as microgrids. Ideally, DER should be capable of continuously providing power to a microgrid load, when the microgrid is disconnected from the utility power grid (i.e., islanded). In addition, DER should be capable of responding to a rapid ramp up and/or ramp down of a load, especially when islanded.

DER generally utilize power electronics to create or convert voltage and current waveforms in order to interface with a utility grid and/or a microgrid. For DER applications, the most common power electronics systems are inverters and converters. Benefits of power electronic switches include switching speed, package size, and the ability to be finely controlled by other electronic systems and software.

As a result, peak currents that can be sourced by the inverters for faults downstream are limited by the manufacturer of the inverter. Hence, faults may prevent an inverter from supplying adequate current to operate a protective relay, resulting in an inability to clear the fault and more often than not, trip the inverter, powering down all connected loads. For inverters operating in isolated microgrids, this may result in a black out condition.

Inverters do not dynamically behave the same as synchronous or induction machines. Inverters do not have a rotating mass component. Therefore, they do not develop inertia to carry a fault current based on an electro-magnetic characteristic. Inverters have a different fault current characteristics for fault currents because these devices lack predominately inductive characteristics that are associated with rotating machines. These characteristics dictate the time constants involved with the circuit.

Accordingly, embodiments of the present disclosure provide inverter containing microgrid power systems that include a kinetic storage device (KSD) (e.g., flywheel) that result in improved energy storage, fault current sourcing, frequency regulation, and system stability.

Figure 1A:
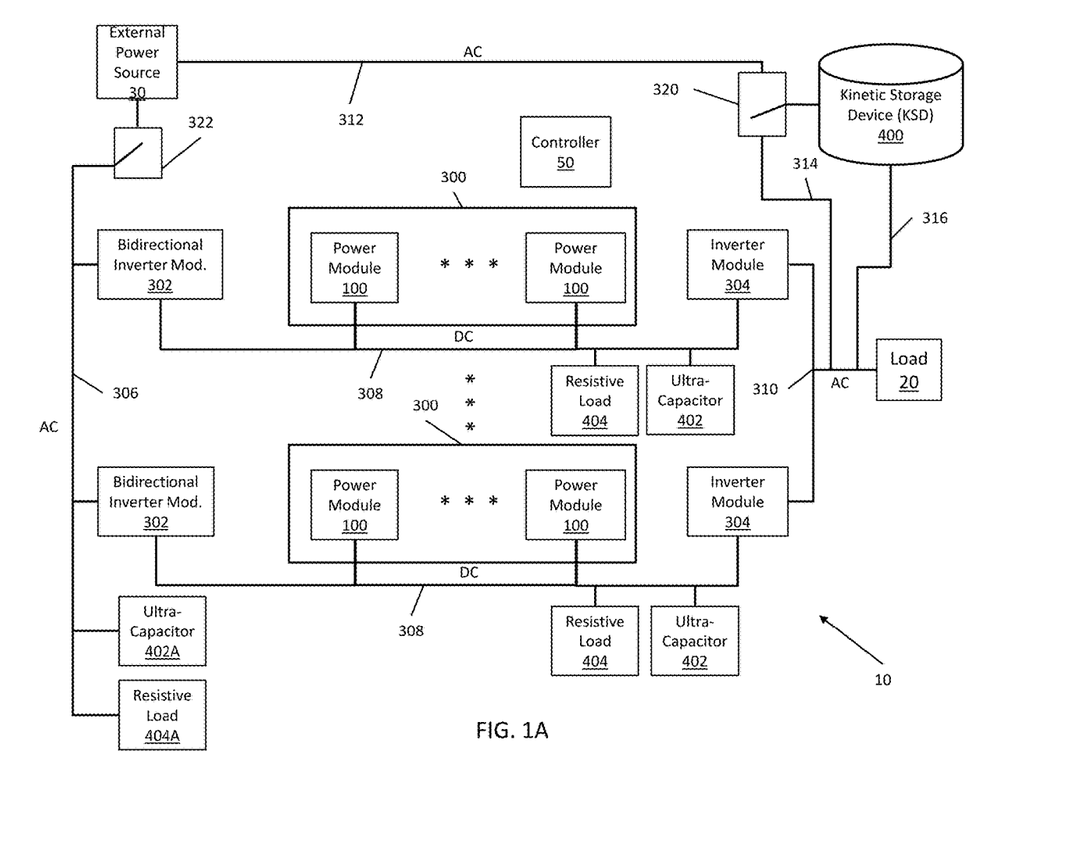
FIG. 1A is a schematic diagram illustrating electrical architecture of a microgrid power system, according to various embodiments of the present disclosure.
Figure 1B:
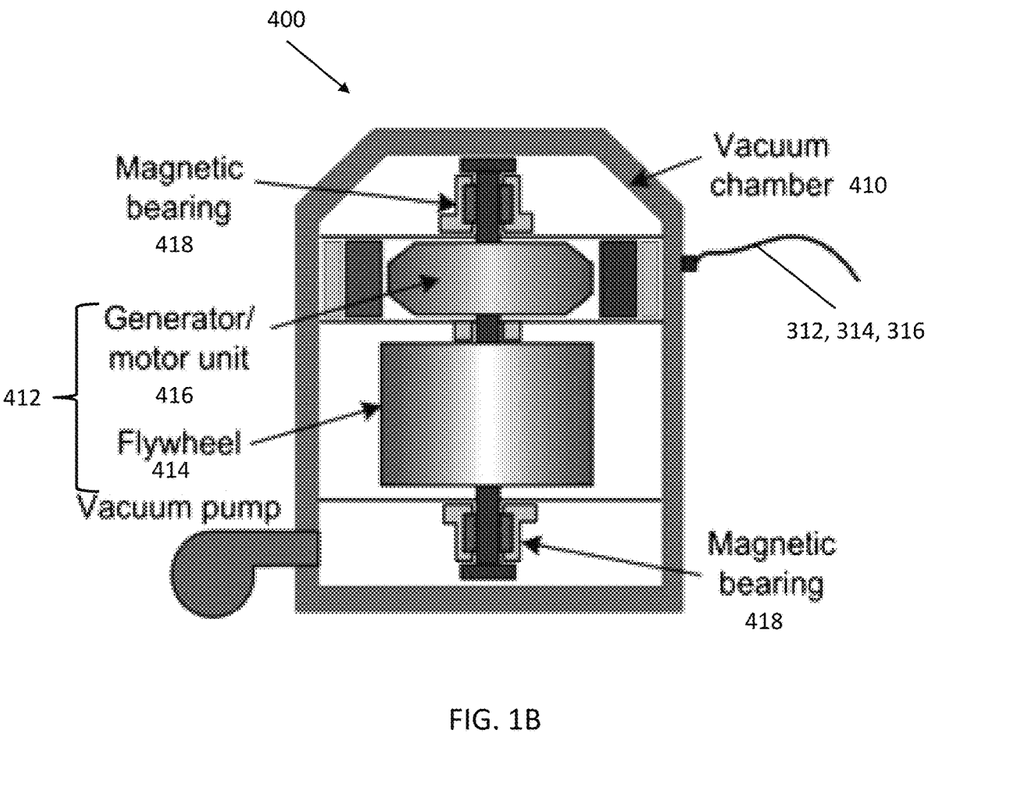
FIG. 1B is a schematic side cross-sectional view illustrating components of a kinetic storage device of the microgrid power system of FIG. 1A.

FIG. 1A is a schematic illustrating electrical architecture of a microgrid power system 10, such as a fuel cell microgrid system, according to various embodiments of the present disclosure. FIG. 1B is a schematic illustrating the KSD 400 that may be utilized in the system 10 of FIG. 1A. Referring to FIGS. 1A and 1B, the microgrid power system 10 may include a variety of components, including any number and combination of power modules 100, which may be arranged in power module groups 300, grid-side inverter modules, such as bi-directional inverter modules 302, load-side inverter modules, such as DC/AC inverter modules 304, an AC bus 306, DC busses 308, and AC load busses 310.

The power modules 100 may comprise fuel cell power modules, such as solid oxide fuel cell (SOFC) power modules, and/or any other type of DC power source power modules, such as solar cell power modules, etc. For simplicity, the microgrid power system 10 as described below includes fuel cell power modules 100.

The microgrid power system 10 may include any number of controllers 50 configured to receive data signals from and send control signals to any number and combination of the components of the microgrid system via any number of wired and/or wireless connections. The controller 50 may be any form of programmable logic (e.g., computing) device or system, such as a server or system control device, which may be configured to perform operations of various embodiments. The microgrid system may be electrically connectable to a load 20 configured to operate using AC power (i.e., AC load 20). Each inverter module 304 may be configured to provide the same amount of power to the AC load 20 via a load bus 310.

The microgrid power system 10 may include any number of power module groups 300, such as 2 to 20, e.g., 2 to 6. Each power module group 300 may include any number of fuel cell power modules 100, such as 1 to 12, e.g., 5 to 10. In some embodiments, the number of power modules 100 included in a power module group 300 may vary between the various power module groups 300. The power modules 100 of a single power module group 300 may be insufficient to generate power to satisfy at least normal power demands of the AC load 20. The number of power modules 100 divided among multiple power module groups 300 in the fuel cell microgrid system may be at least as many power modules 100 needed to generate sufficient total power to satisfy at least normal power demands of the AC load 20.

Similarly, the number of power modules 100 divided among multiple power module groups 300 in the fuel cell microgrid system may be at least as many power modules 100 necessary to generate an equal amount of power from each power module group 300 to satisfy at least normal power demands of the AC load 20. In various embodiments, the number of power modules 100 may include any number of redundant power modules 100, so that in case of reduced or no electrical output from at least one power module 100, a redundant power module 100 may be used to continue supply of the power demand of the AC load 20.

Each power module group 300 may be configured to supply DC power to the corresponding DC bus 308, which may provide the DC power to a corresponding load-side inverter module, such as a DC/AC inverter module 304 and/or a corresponding grid-side inverter module, such as a bidirectional inverter module 302. Each DC bus 308 may be configured as a common electrical conduit for respective groups of a bi-directional inverter module 302, a power module group 300, and an inverter module 304. The DC bus 308 may be configured to transmit DC power between the bi-directional inverter module 302, the power module group 300, and the inverter module 304 of a respective group. The DC bus 308 may electrically connect the DC end of each of the bi-directional inverter 302 and the input end of the inverter module 304.

The inverter modules 304 may include a DC/AC inverter and may be configured to invert the received DC power and output AC power to the AC load 20 via the load bus 310. The load bus 310 may be configured as a common electrical conduit for the inverter modules 304. The load bus 310 may electrically connect the AC end of each of the inverter modules 304 and the AC load 20. The load bus 310 may be configured to transmit AC power between the inverter modules 304 and the AC load 20.

The bidirectional inverter modules 302 may be configured to rectify AC power received from the AC bus 306 and output DC power to a corresponding DC bus 308. The bidirectional inverter modules 302 may also invert DC power received from a corresponding DC bus 308, and output AC power to the AC bus 306. The AC bus 306 may be configured as a common electrical conduit for the bi-directional inverter modules 302. The AC bus 306 may be configured to transmit AC power between the bi-directional inverter modules 302 and the external power source 30.

In some embodiments, the microgrid power system 10 may be connected to the external power source 30, such as a utility grid and/or another auxiliary power source configured to provide AC power (e.g., wind turbine), by an auxiliary power switch 322, such as a transfer switch. In particular, the auxiliary power switch 322 may be configured to selectively electrically connect the external power source 30 to the AC bus 306.

The fuel cell microgrid system may include any number of bi-directional inverter modules 302, each disposed between the AC bus 306 and its respective DC bus 308. In some embodiments, a fuel cell microgrid system may include a one-to-one ratio of power module groups 300 to bi-directional inverter modules 302.

Preferably, during normal microgrid power system operation, each power module group 300 may provide substantially the same amount of power to a corresponding inverter module 304, via a corresponding DC bus 308. As such, each inverter module 304 may provide substantially the same amount of power to the AC load 20 via the load bus 310. For example, each inverter module 304 may be configured to supply a designated amount of power having a given voltage and/or current, based on power configuration of the AC load 20 and/or the power demand of the AC load 20. The fuel cell microgrid system 10 may include any number of inverter modules 304, each disposed between a power source and the AC load 20. In some embodiments, a fuel cell microgrid system may include a one-to-one ratio of power module groups 300 to inverter modules 304.

In some embodiments, the bi-directional AC/DC inverters 302 may be configured to export DC power to the AC bus 306, in response to an amount of power, such as a measured voltage and/or current, on the DC bus 308 exceeding a DC power threshold, such as a voltage and/or current threshold. The AC bus 306 may transmit the exported AC power to the external power source 30 or other components connected thereto.

The bi-directional AC/DC inverters 302 may be configured to import AC power (i.e., rectify AC power to DC power) in response to an amount of power on the DC bus 308 falling short of the DC power threshold. In some embodiments, the DC power threshold may be a voltage and/or current at which equal power supplied from each of the power module groups 300 may satisfy the load demand of the AC load 20. Therefore, DC power on the DC bus 308 exceeding the DC power threshold may be power in excess of what the inverter module 304 may output to the AC load 20 via the load bus 310. DC power on the DC bus 308 falling short of the DC power threshold may be power in deficit of what the inverter module 304 may output to the AC load 20 via the load bus 310. In some embodiments, the DC power threshold may be a static value based on the electrical configuration of the AC load 20. In some embodiments, the DC power threshold may be a dynamic value based on the load demand of the AC load 20.

The controller 50 may directly measure and/or interpret received signals, such as the voltage and/or current on the DC bus 308. For example, the controller 50 may directly measure and/or interpret received signals as the voltage and/or current on the DC bus 308 at and/or from the bi-directional inverter module 302. The controller 50 may further compare the voltage and/or current on the DC bus 308 to the DC power threshold. In response to determining from the comparison that the voltage and/or current on the DC bus 308 exceeds the DC power threshold, the controller 50 may signal and/or control the bi-directional AC/DC inverter 302 to export DC power. In response to determining from the comparison that the voltage and/or current on the DC bus 308 falls short the DC power threshold, the controller 50 may signal and/or control the bi-directional AC/DC inverter 302 to import AC power. As such, when DC power on the DC bus 308 is in excess of what the inverter module 304 may output to the AC load 20 via bus 310, the excess amount power may be output to the AC bus 306 from the DC bus 308. When the DC power on the DC bus 308 is in deficit of what the inverter module 304 may output to the AC load 20 via bus 310, the deficit amount of power may be input to the DC bus 308 from the AC bus 306.

The control of one or more bi-directional inverter modules 302 may provide sufficient DC power to each of the inverter modules 304 for each of the inverter modules 304 to provide an equal amount of AC power to satisfy the load demand of the AC load 20. As such, imbalances in the outputs of the inverter modules 304 may be balanced by remedying deficits of DC power on any of the DC busses 308 by importing AC power so that each of the inverter modules 304 may provide the equal amount of AC power.

In some embodiments, the controller 50 may be a central controller configured to communicatively connect to any number and combination of components of the fuel cell microgrid system. In some embodiments, the controller 50 may be multiple dispersed controllers configured to communicatively connect to any number and combination of components of the fuel cell microgrid system. In some embodiments, the controller 50 may be a standalone controller of the fuel cell microgrid system. In some embodiments, the controller 50 may be an integrated controller of any number and combination of components of the fuel cell microgrid system. Any number and combination of the forgoing configurations of the controller 50 may be implemented in a fuel cell microgrid system.

The AC load 20 consumes power from the fuel cell microgrid system. While one AC load 20 is shown in FIG. 1A, the fuel cell microgrid system may provide power to any number of AC loads 20. A voltage and/or amperage of power required by an AC load 20 may be a power demand of the AC load 20 on the fuel cell microgrid system. In some embodiments, multiple AC loads 20 may require voltage and/or amperage of power to be within specific requirements and combined these requirements may present a power demand of the AC load 20 on the fuel cell microgrid system.

Power Storage and Fluctuation Control

Unlike intermittent power sources, such as photovoltaics and wind turbines, the fuel cell power modules 100 may provide continuous and consistent power to the microgrid system. However, fuel cell systems may be relatively slow in responding to load changes. When connected to the external power source 30, the microgrid power system 10 may draw or output power from the external power source 30 to immediately compensate for load changes. For example, additional power can be drawn from the external power source 30, if the power demands of the AC load 20 spike, and excess locally generated power can be provided to the external power source 30, if the AC load 20 drops off.

However, the microgrid power system 10 may operate in an island mode when disconnected from the external power source 30. For example, the microgrid power system 10 may be disposed in a remote location where a utility grid connection cannot be established, or the external power source 30 may experience a power outage or fluctuation, in which the switch 322 disconnects the microgrid 10 from the external power source 30.

Accordingly, the microgrid power system 10 may include energy storage devices, such as batteries and/or ultra-capacitors 402, and energy dissipating (e.g., "braking") devices, such as resistive loads 404 that may be electrically connected to each DC bus 308. The resistive loads 404 may include internal switches (not shown) which are closed by the controller 50 when power from the power modules 100 should be provided to the resistive loads 404. By locating the energy storage devices and the energy dissipating devices on the DC side of the inverter modules 302 and 304, power from the power modules 100 is provided directly to the energy storage devices and the energy dissipating devices, and does not have to travel through the inverter modules 302 and 304.

The energy storage devices preferably include the ultra-capacitors 402, because ultra-capacitors may provide more rapid charging and discharging, and a smaller footprint, as compared to comparable battery systems. In addition, for larger microgrid systems, such as microgrid systems of 20 MW or more, the charging requirements of a battery storage system may exceed an amount of power available for charging, thereby rendering battery systems impracticable for larger applications. Therefore, in one embodiment, the ultracapacitors may be used as the energy storage devices within the fuel cell system cabinets, while a battery energy storage system may be used as an external energy storage device. However, ultra-capacitors may have a relatively low power storage capacity. As such, the inverter modules 200 and ultra-capacitors 402 may not be capable of providing a fault current sufficient to clear a fault, such as a fault current sufficient to open a faulted protective relay, as discussed below with respect to FIGS. 2A and 2B.

The ultra-capacitors 402 may be configured to store power generated by the power modules 100 that exceeds the power demand of the AC load 20. In some embodiments, the ultra-capacitors 402 may alternatively be charged using power input from the external power source 30 or another alternative power source. If the AC load 20 power demand exceeds the power generation capacity of the power modules 100, the ultra-capacitors 402 may provide power to the AC load 20 to supplement the power output of the power modules 100.

In various embodiments, the microgrid power system 10 may optionally include an auxiliary ultra-capacitor 402A and an auxiliary resistive load 404A connected to the AC bus 306. The auxiliary ultra-capacitor 402A and auxiliary resistive load 404A may be used in place of or in addition to the ultra-capacitors 402 and resistive loads 404.

The resistive loads 404 may dissipate excess power generated by the power modules 100 connected to the corresponding DC bus 308. In some embodiments, the resistive loads 404 may include resistors configured to convert excess power into heat. For example, if the power demand of the AC load 20 drops, or the AC load 20 is disconnected from the microgrid power system 10 due to an electrical fault, then the resistive loads 404 may consume the excess power generated by the power modules, until the AC load 20 is restored or the power modules 100 can be safely shut down, thereby preventing fuel cell damage due to excess power generation.

As shown in FIG. 1A, the ultra-capacitors 402 and resistive loads 404 may be connected to the AC load 20 through corresponding inverter modules 304. However, inverters operate using electronic components rather than a rotating mass component, and thus, may not develop inertia needed to carry a fault current based on an electro-magnetic characteristic. In addition, inverters may have a different envelope than a rotating machine, because inverters may lack predominately inductive characteristics that are associated with rotating machines. As such, it may be difficult to generate a sufficient fault current when using an inverter. Finally, inverters generate a synthetic AC waveform, and thus, may not be suitable to accurately control the frequency an AC waveform.

As shown in FIGS. 1A and 1B, the microgrid power system 10 may include the kinetic storage device (KSD) device 400. For example, the KSD 400 may include a rotor 412 comprising a flywheel 414 and a motor/generator 416, disposed in a vacuum chamber 410. The rotor 412 may be disposed on magnetic bearings 418 to reduce friction. KSD 400 may be configured to store kinetic energy in the flywheel 414 by using power supplied to the motor generator 416 to rotate the flywheel 414 and may be configured to generate power by using the flywheel 414 to rotate the motor generator 416 and generate electricity. In particular, the KSD 400 may be configured to provide immediate frequency response, system stability, and additional fault current.

A power input of the KSD 400 may be selectively electrically connected to a first charging line 312 and/or a second charging line 314 by a charging switch 320. A power output of the KSD 400 may be connected to the AC load bus 310 by a discharging line 316. In particular, power output from the external power source (e.g., power grid) 30 may be provided to the KSD 400 and stored as kinetic energy in a rotating flywheel. For example, during normal operation, AC power may be provided to the KSD 400 from the external power source 30 to maintain flywheel rotation by setting the charging switch 320 to connect the KSD 400 to the first charging line 312, and to disconnect the KSD 400 from the second charging line 314. For example, the flywheel 414 may be normally rotated at a speed ranging from about 5000 to about 10,000 rpm, such as about 7500 rpm. In some embodiments, power generated by the power modules 100, or both the power modules 100 and the external power source 30, may be provided to the KSD 400 and stored as kinetic energy. For example, if the power generated by the power modules 100 is in excess of the power demand of the AC load 20, then AC power may be provided to the KSD 400 from the power modules 100 to maintain flywheel rotation by setting the charging switch 320 to connect the KSD 400 to the second charging line 314, and to disconnect the KSD 400 from the first charging line 312. In one embodiment, the power modules 100 provide power to the KSD in the island mode. If the AC load 20 is not receiving sufficient power from the power modules 100 and/or the external power source 30, then the AC load 20 may draw power from the KSD 400 via the discharging line 316.

The controller 50 may be configured to monitor the frequency and/or voltage of the AC power on the AC load bus 310 that is output from the inverter modules 304. If the controller 50 detects a frequency deviation that is outside of a preset range, then the controller 50 may activate the KSD 400 to inject or extract power from the AC bus 310, in order to correct the frequency deviation. In various embodiments, the controller 50 may be configured to use the KSD 400 to inject or extract power from the AC bus 310, if the frequency of the AC power varies by more than about +/−2 hertz (Hz), such as by more than about +/−1 Hz. For example, the controller 50 may be configured to use the KSD 400 to maintain the frequency of the AC power within a range of from about 59 Hz to about 61 Hz, when the AC load 20 is configured to operate using 60 Hz AC power. As such, the KSD 400 may operate to immediately correct AC frequency variations, thereby improving system stability. Therefore, by providing the KSD 400 on the AC side of the inverter modules 302 and 304 (i.e., between the inverter modules and the AC load 20), a faster response to a system fault or insufficient power provided to the AC load 20 may be provided by the controller.

For example, the frequency from the AC load bus 310 and a reference frequency band of 59 to 61 Hz may be provided to a comparator. The comparator then outputs a signal to the controller 50 which indicates if the frequency on the AC load bus 310 is within or outside the reference frequency band. The controller 50 then takes an action (e.g., switching the position of the switches 320 and/or 322) if the frequency on the AC load bus 310 is within or outside the reference frequency band. For example, if the frequency on the outside load bus 310 is outside the reference frequency band, this may indicate that the external power source 30 stopped providing power to the microgrid power system 10, then the controller places the microgrid power system 10 in the island mode by disconnecting the external power source from the AC bus 306 and from the KSD 400 using the respective switches 322 and 320.

Figure 2A:
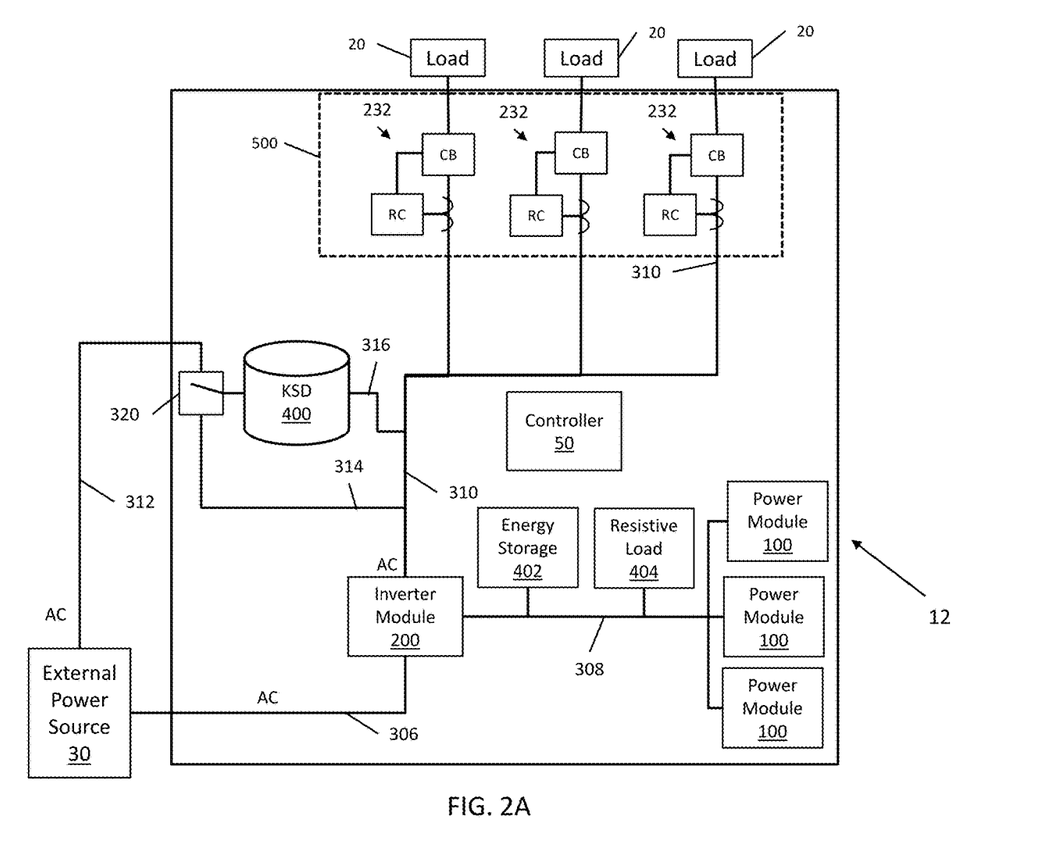
FIGS. 2A and 2B are schematic diagrams illustrating electrical architecture of fuel cell systems, according to other embodiments of the present disclosure.
Figure 2B:
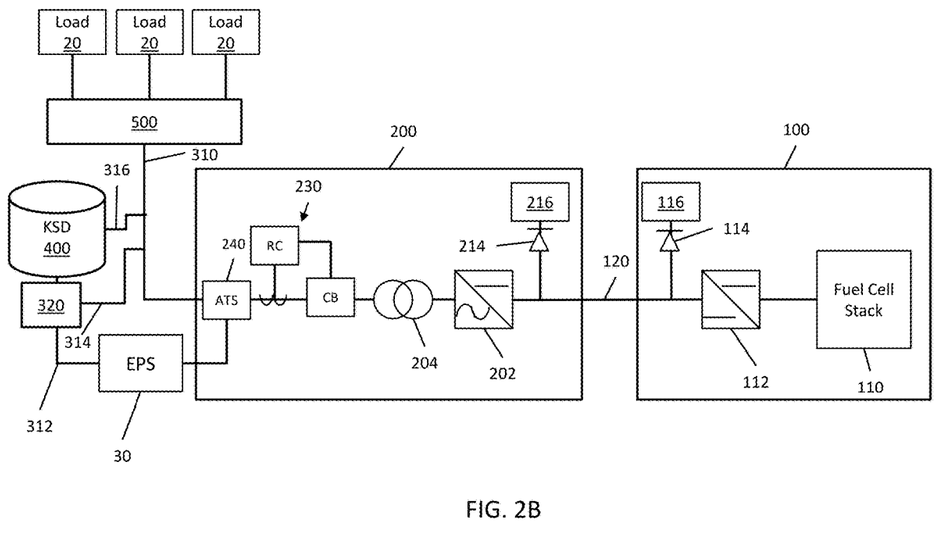

FIG. 2A is a schematic diagram illustrating electrical architecture of a microgrid power system 12, according to various embodiments of the present disclosure. FIG. 2B is a schematic diagram illustrating the electrical architecture of a power module 100 and an inverter module 304 of the power system 12. The microgrid power system 12 may be similar to the microgrid power system 10. As such, only the differences therebetween will be discussed in detail.

Referring to FIGS. 2A and 2B, the microgrid power system 12 may include at least one controller 50, at least one power module 100, an inverter module 200, the KSD 400, an energy storage device, such as ultra-capacitors 402, and an energy dissipating device, such as resistive loads 404. The power modules 100 may each include a power source, such as a stack of fuel cells 110, such as solid oxide fuel cells having a ceramic oxide electrolyte, separated by conductive interconnect plates. However, and suitable power source may be utilized, such as wind turbines, solar photovoltaics, microturbines, combinations thereof, etc. Other fuel cell types, such as proton exchange membrane (PEM), molten carbonate, phosphoric acid, etc., may be used in other embodiments.

The power modules 100 may also include a DC/DC converter 112, a diode 114, and a DC electrical load 116. The DC/DC converter 112 may be configured to convert the voltage of power output from the fuel cells 110 to a voltage suitable for the DC load 116. The DC load 116 may include balance-of-plant components of the power module 100. The diode 114 may be configured to control current flow to the DC load 116. The power module 100 may be connected to the inverter module 200 by an electrical bus 120.

The inverter module 200 may include an inverter 202, a transformer 204, a diode 214, a balance-of-plant DC load 216, a protective relay 230, and an optional automatic transfer switch (ATS) 240. The inverter 202 may be a DC/AC inverter or a bidirectional inverter, in some embodiments. The DC load 216 may include balance-of-plant components of the inverter module 200. The diode 214 may be configured to control current flow to the DC load 216.

The inverter module 200 may be electrically connected via a power distribution system (PDS) 500 to one or more AC loads 20 by an AC bus 310. The protective relay 230 may include a circuit breaker configured to electrically disconnect the inverter module 200 from the power distribution system 500. The protective relay 230 may be configured to receive information about the EDS (voltage, current, and frequency) of power flowing through the bus 120 to the PDS 500. The protective relay 230 may include current and voltage transformer (e.g., relay coil) configured to transform measured voltage and current values to a more appropriate power level to be utilized by the protective relay 230. Based on this information, the protective relay 230 reacts to any abnormal conditions detected, for example, by tripping the circuit breaker to disconnect the inverter module from the load 20, if necessary. Each protective relay is set or programmed for the desired tripping time (i.e., time delay for relay coordination and system reliability purposes). The decision to trip open or close the circuit breaker of the protective relay 230 may be made by the relay logic algorithms that may be programmed into controller 50.

The ATS 240 may be configured to selectively electrically connect the inverter module 200 to the AC bus 310 or to an external power source 30. For example, the auxiliary power source 30 may be used to provide power to the system during startup of the power module 100. In addition, when the power generation of the power module 100 exceeds the power requirements of the AC load 20, the excess power may be provided to the auxiliary power source 30 for use and/or storage. In some embodiments, the ATS 240 may operate as a circuit breaker, and the protective relay 230 may be omitted.

The microgrid power system 12 may include a PDS 500 containing load protective relays 232 that are configured to control power output through the AC bust 310 to respective AC loads 20. The protective relays 232 may be configured to receive information about the EDS (voltage, current, and frequency) of power flowing through the AC bus 310 to a corresponding AC load 20. The protective relays 232 may include a current transformer and a voltage transformer configured to transform measured voltage and current values to a more appropriate power level to be utilized by the protective relays 232. Based on this information, the protective relays 232 may be configured to react to any abnormal conditions detected, for example, by tripping a circuit breaker to disconnect the corresponding AC load 20, if necessary. Each protective relay 232 may be set or programmed for the desired tripping time (i.e., time delay for relay coordination and system reliability purposes). The decision to trip open or to close the circuit breakers is made by the relay logic algorithms that may be programmed by a relay engineer.

The protective relays 230, 232 may include similar components and/or features. In some embodiments, other protective components, such as fuses, may be used in place of the protective relays 230, 232.

The KSD 400 may be configured to inject or extract power from the AC bus 310. In particular, a power input of the KSD 400 may be connected to the external power source 30 by the first charging line 312 to the power modules 100 by the second charging line 314, under the control of a grid switch 320. A power output of the KSD 400 may be connected to the AC bus 310 by a discharging line 316.

The controller 50 may be implemented using computing devices (such as computer) comprising processors, memory and other components that have been programmed with instructions to perform specific functions or may be implemented in processors designed to perform the specified functions. A processor may be any programmable microprocessor, microcomputer or multiple processor chip or chips that can be configured by software instructions (applications) to perform a variety of functions, including the functions of the various embodiments described herein. In some computing devices, multiple processors may be provided. Typically, software applications may be stored in the internal memory before they are accessed and loaded into the processor. In some computing devices, the processor may include internal memory sufficient to store the application software instructions. The processor may include a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The controller 50 may be configured to control the operations of the inverter module 200, the KSD 400, and/or the power modules 100. The controller 50 may include a central processing unit and/or a memory configured to store operating software. In some embodiments, the controller 50 may provide an interface to allow an operator to control the system 12.

According to various embodiments, the controller 50 may be programmed with a control algorithm that enables the microgrid power system 12 to source an additional current from the KSD 400 for a pre-determined period of time, such as a time period needed for the protective relays 232 to sense and clear a fault, or to a time period needed to ride out a transient power fluctuation. In particular, the controller 50 may be configured to detect an increase in the magnitude of the AC load 20 power demand applied to (i.e., power drawn from) the inverter module 200 that corresponds to a fault condition. The controller 50 may then control the KSD 400 to provide additional fault current to the AC bus 130.

According to various embodiments, the controller 50 may be configured to control the KSD 400 to provide power to the AC bus 310 in response to a reduction in the frequency of the AC current output from the inverter module 200. The controller 50 may also be configured to control the KSD 400 to extract power from the AC bus 310 via line 314 in response to an increase in the frequency of the AC current output from the inverter module 200. For example, controller 50 may receive frequency data from the protective relay 230, in order to determine whether to extract or inject current from the AC bus 310. As such, the microgrid power system 12 may be configured to provide consistent AC power to the AC loads 20, increased resiliency and reliability, and an ability to ride through potential blackout and brownout conditions.

The microgrid systems 10 and 12 provide dynamic energy storage, where the additional moment of inertia, increased fault current, and better frequency regulation can all be achieved at the same time. The addition of the KSD 400 on the AC sides of the inverter modules solves the problem of lack of sufficient energy storage for large microgrids, where several distributed energy systems are working together. The embodiment KSD provides several benefits, including system stabilization, increased fault current, and potential reduction of the harmonics as the synchronous generator provides a natural sine waveform instead of the artificial waveform created by the switching equipment, whose fundamental frequency is sinusoidal waveform.

The construction and arrangements as shown in the various examples are illustrative only. Although only a few examples have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative examples. Other substitutions, modifications, changes, and omissions may also be made in the design, operating conditions and arrangement of the various examples without departing from the scope of the present disclosure. Any one or more features of any example may be used in any combination with any one or more other features of one or more other examples. It is intended that the specification and examples be considered as exemplary only, with a true scope being indicated by the following claims and their equivalents.

What is claimed is:

1. A microgrid power system, comprising:
    a power module configured to generate direct current (DC) power;
    an inverter module having a DC side and an AC side, and configured to invert DC power received from the power module on the DC side and output alternating current (AC) power on the AC side;
    a DC bus electrically connecting an output of the power module to an input on the DC side of the inverter module;
    an AC load bus configured to electrically connect an output on the AC side of the inverter module to an AC load;
    an energy storage device electrically connected to the DC bus;
    a kinetic storage device (KSD) electrically connected to the AC load bus; and
    a first charging line which electrically connects the KSD to an external AC power grid, wherein the first charging line is configured to provide AC power to the KSD from the external AC power grid.

2. The microgrid power system of claim 1, wherein the KSD comprises a flywheel and a motor/generator connected to the flywheel.

3. The microgrid power system of claim 1, further comprising a controller configured to control the KSD according to a detected frequency of AC power provided to the AC load through the AC load bus, such that the KSD maintains the frequency of the AC power within a set frequency range.

4. The microgrid power system of claim 3, wherein the controller is configured to control the KSD, such that:
    the KSD supplies power to the AC load bus when the detected frequency of the AC power is more than one hertz (Hz) lower than a set frequency; and
    the KSD receives power from the AC load bus when the detected frequency of the AC power is more than one Hz greater than the set frequency.

5. The microgrid power system of claim 1, further comprising a controller configured to control the KSD in response to detecting a fault condition, such that the KSD supplies a fault current to the AC load bus for a set period of time after the fault condition is detected.

6. The microgrid power system of claim 1, further comprising a resistive load electrically connected to the DC bus and configured to selectively dissipate at least a portion of the DC power generated by the power module.

7. A microgrid power system, comprising:
    a power module configured to generate direct current (DC) power;
    an inverter module having a DC side and an AC side, and configured to invert DC power received from the power module on the DC side and output alternating current (AC) power on the AC side;
    a DC bus electrically connecting an output of the power module to an input on the DC side of the inverter module;
    an AC load bus configured to electrically connect an output on the AC side of the inverter module to an AC load;
    an energy storage device electrically connected to the DC bus;
    a kinetic storage device (KSD) electrically connected to the AC load bus on the AC side of the inverter module;

a discharging line electrically connecting an output of the KSD to the AC load bus;

a first charging line electrically connected to an external AC power source;

a charging switch configured to selectively connect the first charging line to an input of the KSD;

a second charging line electrically connected to the AC load bus and the charging switch; and a controller configured to control the charging switch, such that the KSD is provided with power from the first charging line or the second charging line.

8. The microgrid power system of claim 1, wherein:

the power module comprises a fuel cell power module; and the energy storage device comprises an ultracapacitor energy storage device.

9. The microgrid power system of claim 1, further comprising the AC load electrically connected to the AC load bus.

10. The microgrid power system of claim 1, further comprising a plurality of additional power modules configured to provide DC power to the DC bus.

11. A method of operating a microgrid power system, comprising:

providing direct current (DC) power from a power module to an energy storage device and to a DC side of an inverter module; and providing alternating current (AC) power from an AC side of the inverter module to an AC load and to a kinetic storage device (KSD); and stopping the providing of AC power from the AC side of the inverter module to the KSD and providing AC power from an external power grid to the KSD.

12. The method of claim 11, wherein the KSD comprises a flywheel and a motor/generator connected to the flywheel.

13. The method of claim 11, further comprising controlling the KSD according to a detected frequency of AC power provided to the AC load, such that the KSD maintains the frequency of the AC power provided to the AC load within a set frequency range.

14. The method of claim 13, wherein the KSD receives the AC power from the AC side of the inverter module when the detected frequency of the AC power is more than one Hz greater than the set frequency.

15. The method of claim 14, further comprising providing the AC power from the KSD to the AC load when the detected frequency of the AC power is more than one hertz (Hz) lower than a set frequency.

16. The method of claim 11, further comprising controlling the KSD in response to detecting a fault condition, such that the KSD supplies a fault current for a set period of time after the fault condition is detected.

17. The method of claim 11, further comprising a resistive load electrically connected to the power module and configured to selectively dissipate at least a portion of the DC power generated by the power module.

18. The method of claim 11, wherein:

the power module comprises a fuel cell power module; and the energy storage device comprises an ultracapacitor energy storage device.

19. The method of claim 11, wherein the AC power is provided from the AC side of the inverter module to the KSD when the microgrid is operating in an island mode disconnected from the external power grid.

20. The microgrid power system of claim 7, wherein the external power source comprises an external AC power grid.

* * * * *